United States Patent
Remington et al.

(10) Patent No.: US 11,091,142 B2
(45) Date of Patent: Aug. 17, 2021

(54) DYNAMIC POWERTRAIN TRIM TEMPLATE SELECTION AND VEHICLE FLEET OPTIMIZATION

(71) Applicant: Cummins inc., Columbus, IN (US)

(72) Inventors: Christopher Michael Remington, Columbus, IN (US); Daniel Reed Dempsey, Columbus, IN (US); Steven W. Reedy, Columbus, IN (US); Jason A. Owens, Scipio, IN (US); Radhika Cherukuru, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 142 days.

(21) Appl. No.: 16/150,346

(22) Filed: Oct. 3, 2018

(65) Prior Publication Data

US 2019/0100192 A1 Apr. 4, 2019

Related U.S. Application Data

(60) Provisional application No. 62/567,452, filed on Oct. 3, 2017.

(51) Int. Cl.
*G06F 19/00* (2018.01)
*G06G 7/70* (2006.01)
(Continued)

(52) U.S. Cl.
CPC ............ *B60W 10/04* (2013.01); *B60W 40/08* (2013.01); *G05D 1/0291* (2013.01);
(Continued)

(58) Field of Classification Search
CPC .. B60W 10/04; B60W 40/08; B60W 2556/55; B60W 2530/10; B60W 2530/18; G05D 1/0291
See application file for complete search history.

(56) References Cited

U.S. PATENT DOCUMENTS

5,189,621 A 2/1993 Onari et al.
6,571,191 B1 5/2003 York et al.
(Continued)

*Primary Examiner* — Mahmoud S Ismail
(74) *Attorney, Agent, or Firm* — Taft Stettinius & Hollister LLP (57) ABSTRACT

Apparatuses, methods, and systems comprising vehicle fleet management systems are disclosed. One embodiment is a method that provides a plurality of predetermined powertrain trim templates, where each of the plurality of predetermined powertrain trim templates specifies a plurality of powertrain trim parameters implementable by an electronic powertrain control system to control one or more operational response characteristics of the powertrain. The method includes selecting one of the plurality of predetermined powertrain trim templates and one of a plurality of vehicles of a vehicle fleet to receive the selected one of the plurality of predetermined powertrain trim templates. In response to the act of selecting one of the plurality of predetermined powertrain trim templates, the method transmits via a telematics network one or more modified powertrain trim parameters. Further, the method receives the modified powertrain trim parameters with a telematics system of the selected one of the plurality of vehicles of the vehicle fleet. Also, the method applies the modified trim parameters with the electronic powertrain control system to control the one or more operational response characteristics of the powertrain.

23 Claims, 6 Drawing Sheets

(51) Int. Cl.
  B60W 10/04  (2006.01)
  G05D 1/02  (2020.01)
  B60W 40/08  (2012.01)

(52) U.S. Cl.
  CPC ..... *B60W 2530/10* (2013.01); *B60W 2530/18* (2013.01); *B60W 2556/55* (2020.02)

(56) References Cited

U.S. PATENT DOCUMENTS

| | | | |
|---|---|---|---|
| 6,681,987 B1 | | 1/2004 | Ford |
| 6,895,930 B2 | | 5/2005 | Hurley et al. |
| 7,877,198 B2 | | 1/2011 | Tenzer et al. |
| 7,899,610 B2 | | 3/2011 | McCellan |
| 8,024,111 B1 | * | 9/2011 | Meadows .......... G01C 21/3492 |
| | | | 701/414 |
| 9,073,554 B2 | | 7/2015 | Hyde et al. |
| 9,387,861 B1 | * | 7/2016 | Lurie .................... B60W 50/08 |
| 9,564,065 B2 | | 2/2017 | Kwak et al. |
| 9,633,568 B2 | | 4/2017 | Mohn et al. |
| 9,835,248 B2 | * | 12/2017 | Sujan .................. F16H 61/0213 |
| 10,025,302 B2 | | 7/2018 | Miller et al. |
| 2005/0027423 A1 | * | 2/2005 | Minami .................. G01F 9/023 |
| | | | 701/51 |
| 2007/0118502 A1 | | 5/2007 | Aragones et al. |
| 2018/0257664 A1 | * | 9/2018 | Remboski .......... B60W 50/0205 |
| 2019/0016329 A1 | * | 1/2019 | Park .......................... B60L 3/12 |
| 2019/0049959 A1 | * | 2/2019 | Gaither ................ G08G 1/0129 |
| 2019/0180524 A1 | * | 6/2019 | Palmer .................. H04W 4/021 |
| 2020/0174780 A1 | * | 6/2020 | Gintz ....................... G06F 8/66 |

* cited by examiner

DYNAMIC POWERTRAIN TRIM TEMPLATE SELECTION AND VEHICLE FLEET OPTIMIZATION

CROSS REFERENCE

The present application claims the benefit of and priority to U.S. Application No. 62/567,452 filed on Oct. 3, 2017, and the same is hereby incorporated by reference.

BACKGROUND

The present application relates to apparatuses, methods, and systems providing dynamic powertrain trim template selection and vehicle fleet optimization. Vehicle powertrain components such as engines, transmissions, motor/generators, and other prime move components and systems have a number of adjustable trim parameters which can be set to vary how they respond to operator input. Examples of engine trim parameters include engine speed governors, acceleration ramp rate limiters, idle speed settings, idle shutdown times and a number of other trim parameters. Vehicle transmissions have a number of adjustable trim parameters which can be set to vary the operating limits and characteristics of a transmission and how it responds to operator input. Examples of transmission trim parameters include shift set points, hydraulic fluid pressure settings and limits, and hydraulic fluid temperature settings among others. Conventional approaches to setting powertrain trim parameters such as engine trim parameters and transmission trim parameters suffer from a number of shortcomings and drawbacks. For example, manual adjustment of trim parameters for individual vehicles requires technical expertise and equipment, and significant effort and time. It is often not feasible for a fleet operator to adjust trim parameters when it would be desirable to do so such as in response to changing conditions during vehicle missions. The ability to adjust trim parameters for vehicle fleet optimization also suffer from a number of shortcomings and drawbacks. For example, current techniques require fleet operators to undertake a complex and laborious calculus to try to determine parameters that will optimize fleet performance. Such efforts are further limited by the fleet operator's lack of information and tools to determine the results of different parameters on performance of different vehicles in a fleet. There remains a significant need for the unique and inventive apparatuses, methods, systems, and controls disclosed herein.

DISCLOSURE OF ILLUSTRATIVE EMBODIMENTS

For the purposes of clearly, concisely and exactly describing exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY

One exemplary embodiment is a unique method implementable for dynamic powertrain trim template selection and vehicle fleet optimization. Other embodiments include unique systems implementable for dynamic powertrain trim template selection and vehicle fleet optimization. Further embodiments, forms, objects, features, advantages, aspects, and benefits shall become apparent from the following description and drawings.

DETAILED DESCRIPTION OF ILLUSTRATIVE EMBODIMENTS

Figure 1:
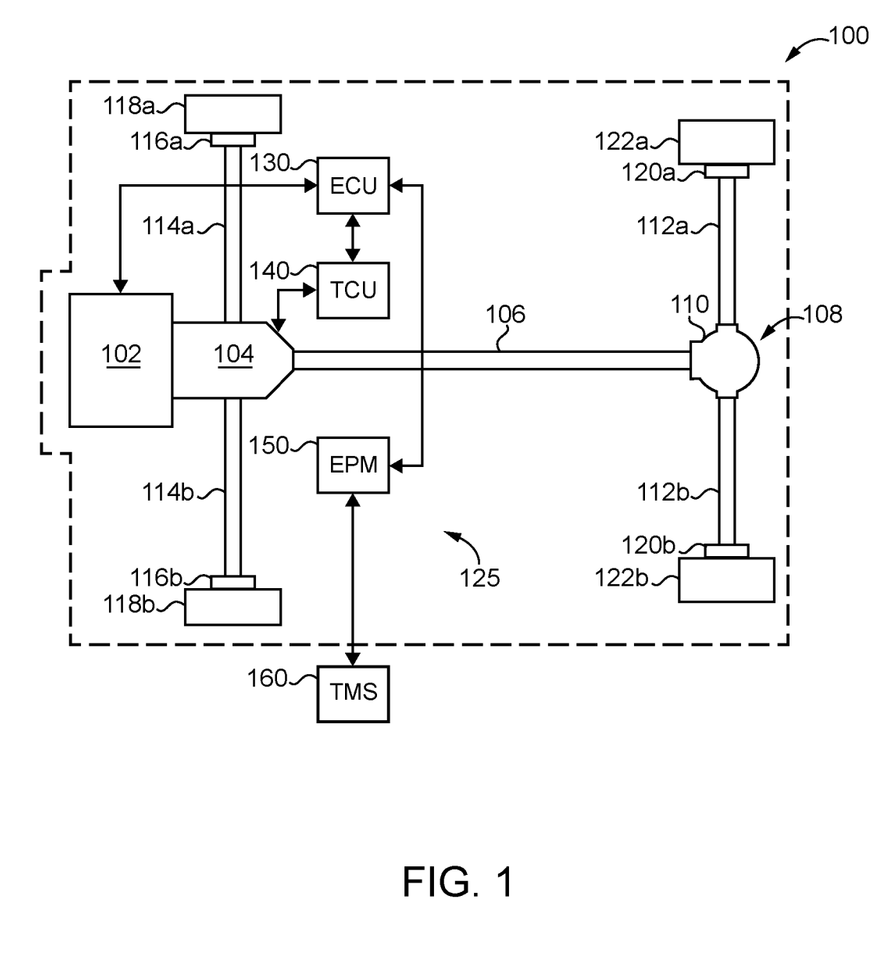
FIG. 1 is a schematic illustration of an exemplary vehicle system.

With reference to FIG. 1, there is illustrated a schematic depiction of an exemplary vehicle 100 including a prime mover structured to provide motive power for vehicle 100. In the illustrated embodiment, the prime mover is structured as an internal combustion engine 102. In other embodiments, the prime mover can be structured differently, for example, as a hybrid electric prime mover including an engine and one or more electric machines or as a pneumatic hybrid prime mover including an engine and one or more pneumatic systems. In further embodiments, the prime mover can be structured as an electric machine prime mover such as in the case of a fuel cell truck that utilizes an electric motor for tractive power. It shall be appreciated that the description herein in the context of engines applies as well to other prime mover systems and additional prime mover components which be present in vehicle 100.

It shall be understood that the description referring to engine 102 is also applicable to these and other types of prime movers. Vehicle 100 further includes a transmission 104 operably connected to engine 102 for receiving the output torque of engine 102 and transmitting the output torque to a drive shaft 106. Vehicle 100 illustrated in FIG. 1 is structured in a rear wheel drive configuration including a final drive 108 having a rear differential 110 connecting the drive shaft 106 to rear axles 112a and 112b. It is contemplated that the components of vehicle 100 be positioned in different locations throughout vehicle 100. In one non-limiting example, in a vehicle having a front wheel drive configuration, the transmission be a transaxle and the final drive reside at the front of the vehicle to connect front axles to the engine via the transaxle.

In the illustrated embodiment, vehicle 100 further includes two front brakes 116a and 116b, each positioned between and operably connected to two front wheels 118a and 118b and front axles 114a and 114b, respectively. Vehicle 100 further includes two rear brakes 120a and 120b, each positioned between two rear wheels 122a and 122b and rear axles 112a and 112b, respectively. It is contemplated that vehicle 100 can have more or fewer tires and/or brakes than illustrated in FIG. 1. In certain embodiments, vehicle 100 can also include various components not shown, such as a fuel system including a fuel tank, a braking system, an engine intake system, and an engine exhaust system, which include an exhaust after-treatment system, to name a few examples.

Vehicle 100 includes an electronic control system 125 which comprises an engine control unit (ECU) 130, sometimes referred to as an engine control module (ECM), or the like, which is directed to regulating and controlling the operation of engine 102. Electronic control system 125 further includes a transmission control unit (TCU) 140 which is directed to the regulation and control of transmission 104. ECU 130 and TCU 140 are each in electrical communication with one another as well as with a plurality of sensors, actuators, and additional components of vehicle 100 via a controller area network (CAN). ECU 130 and TCU 140 be structured to receive a variety of operational information relating to vehicle 100 including, for example, engine speed, transmission speed, engine torque, engine power, gear selection, accelerator position, brake pedal position, ambient temperature, turbocharger boost pressure, intake manifold pressure, intake manifold temperature, exhaust manifold pressure, exhaust manifold temperature, local horizon prediction information, inclinometer information, and GPS or telematics information. The foregoing information can be provided by physical sensors, virtual sensors or combinations thereof.

In certain embodiments, the ECU 130 and the TCU 140 be combined into a single control module, commonly referred to as a powertrain control module (PCM) or powertrain control unit (PCU), or the like. It is contemplated that ECU 130 be integrated within engine 102 and/or TCU 140 be integrated within transmission 104. Other various electronic control units for vehicle subsystems be present in vehicle 100, such as a braking system electronic control unit and a cruise control electronic control unit, for example, but such other various electronic control units for vehicle subsystems are not shown in vehicle 100 to preserve clarity.

In the illustrated embodiment, transmission 104 is provided in the form of an automatic transmission inoperative communication and controllable by TCU 140. It shall be appreciated that other embodiments be provided with a manual transmission in which case TCU 140 be omitted. It shall be appreciated that other embodiments be provided with an automatic manual transmission in which case TCU 104 be provided in an alternate form adapted to perform clutch engagement/disengagement control.

Electronic control system 125 further includes an engine profile management controller (EPM) 150 operably connected to the ECU 130 for receiving vehicle 100 sensor data and conditions. In some forms, EPM 150 may be implemented in ECU 130 rather than as a separate component. EPM 150, which may be dedicated to some or all of the controls and processes disclosed in further detail below as well as to additional control for the regulation and control of the engine in vehicle 100. In the illustrated embodiment, EPM 150 is in electrical communication with the ECU 130. It is contemplated that in certain embodiments EPM is in electrical communication with TCU 140. In certain embodiments, a portion of EPM 150 or the entire EPM is integrated within the ECU 130 and/or TCU 140. EPM 150 further be in electrical communication with one or more of the plurality of vehicle sensors in vehicle 100 for receiving and transmitting conditions of vehicle 100, such as temperature and pressure conditions, for example.

In the exemplary embodiment illustrated in FIG. 1, a navigation and positioning system (i.e., telematics system) 160, such as a global position system (GPS) device mounted external to vehicle 100 and/or an electronic horizon device connected to vehicle 100, be electronically connected to EPM 150 for the purpose of providing future route grade information as well as other look-ahead or forecast information. In certain embodiments, additional information from the navigation and positioning system 160 be transmitted to EPM 150, such as traffic, elevation, and/or weather conditions, for example. It is contemplated that in certain embodiments, specifically where a navigation and positioning system (i.e., TMS) 160 is not connected to EPM 150, that route grade information be programmed into memory and accessed by EPM 150 while the vehicle is traveling along the travel route.

It is contemplated that the controls, control systems, and control devices disclosed herein can be utilized in connection with intelligent transport systems and services (ITS) which comprises systems that integrate of information and communication technologies with transport infrastructure to improve economic performance, safety, mobility, and environmental sustainability. An exemplary ITS system includes three operational layers: a data collection layer, a data aggregation, and translation layer and an information dissemination layer.

The data collection layer can include EPM 150 and system 160 as well as devices and systems on a plurality of vehicles which sense and transmit data associated with a plurality of vehicles at particular geographical locations. The data collection layer can further include sensors, cameras and other data sources which are fixed relative to a roadway, or information from sensors, cameras and other data sources which are provided on surveillance vehicles such as planes and helicopters.

The data aggregation and translation layer comprise one or more computer-based systems which receive and aggregate data from the data collection layer devices and process the received data to provide information about one or more roadway or traffic conditions. In certain aspects, the received data include information about road grade, speed limits, vehicle rate of speed, or change in rate of speed at particular locations which be aggregated and processed to determine traffic speed over a given segment of roadway. In other aspects, information about weather conditions such as wind speed, precipitation and road conditions be derived.

The information dissemination layer can include EPM 150 and system 160 as well as devices and systems on a plurality of vehicles which receive information transmitted from the data aggregation and translation layer. The received information can include road grade information, information about traffic speed over a given segment of roadway, information about speed limits, as well as information about weather conditions such as wind speed, precipitation and road conditions be derived. As further described below, ITS information from one or more of the foregoing layers can be utilized in connection with the controls, control systems, and control devices disclosed herein.

It is contemplated that at least a portion of the conditions and/or measured inputs required for interpreting signals by EPM 150 be received from ECU 130 and/or TCU 140, in addition to or alternatively to the plurality of vehicle sensors. It is further contemplated that in certain embodiments ECU 130, TCU 140, and EPM 150 can transmit data communication messages across a communication area network (CAN). ECU 130, TCU 140 and EPM 150, comprise components of an exemplary electronic control system. Various other electronic control system configurations are also contemplated.

Electronic engine control systems implementing the controls disclosed herein utilize received data and signal inputs, stored data values, constants, and functions, as well as computer-executable operating instructions stored on one or more non-transitory computer-readable media. The control operations and processes disclosed herein be performed at least in part by EPM 150, TCU 140, ECU 130, or combinations thereof as well as in other controllers and control units or combinations including the same. The illustrated controls and control processes are understood to be exemplary only, and operations can be combined or divided, and added or removed, as well as re-ordered in whole or in part unless stated explicitly to the contrary herein.

Certain embodiments include controls implementing engine speed controls based at least in party upon engine load estimations. The engine speed control techniques disclosed herein can be utilized to optimize fuel consumption by limiting engine speed when a vehicle does not require torque higher than an estimated torque. In certain embodiments, the engine speed control techniques limit a maximum engine speed in all gears except for the top gear. In certain embodiments, a higher engine speed is allowed in the second to top gear than in lower gears providing an adjusted speed delta between the second to top gear and lower gears. The engine speed control techniques disclosed herein allow normal engine speed ranges at high loads during gear changes and in top gear.

Figure 2:
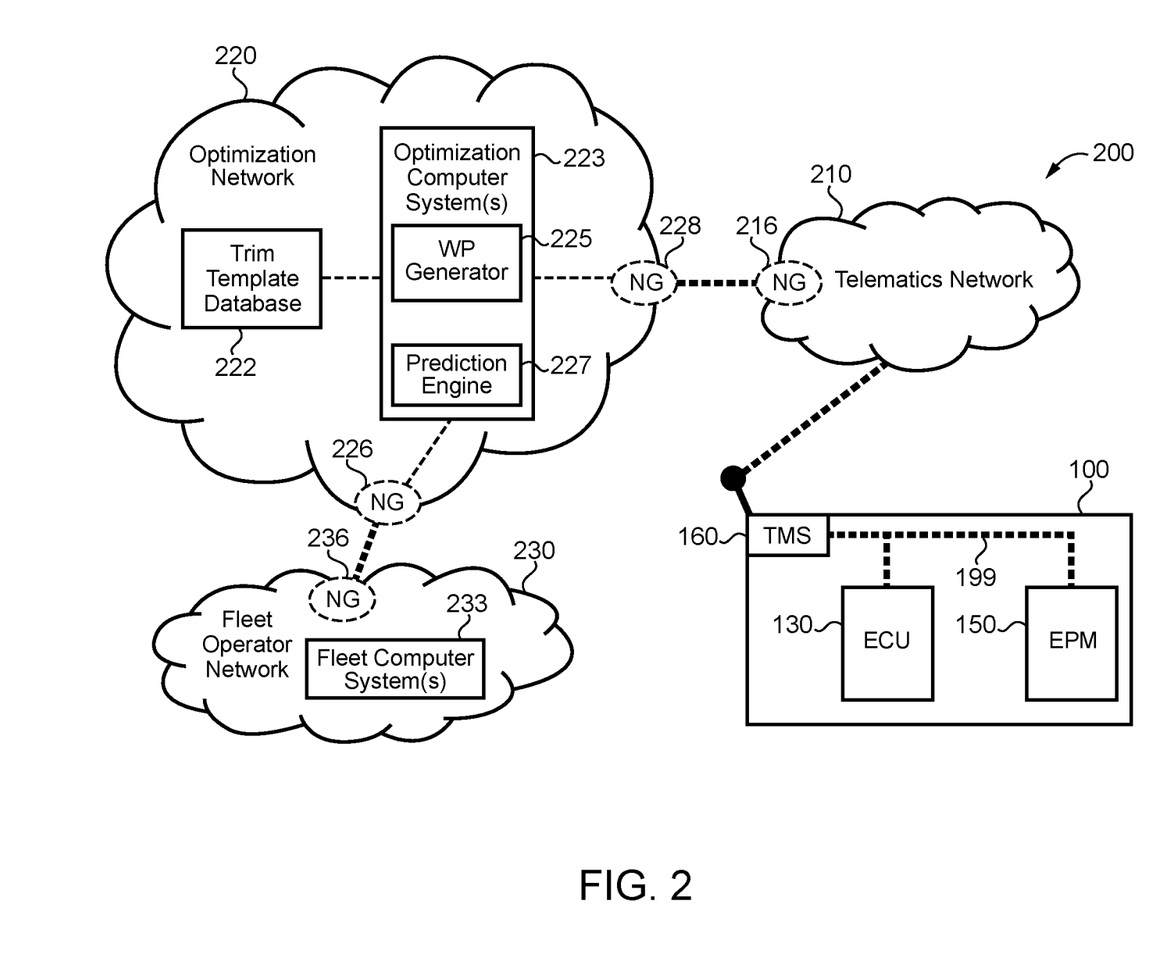
FIG. 2 is a schematic illustration of an exemplary vehicle fleet management system.

With reference to FIG. 2, there is illustrated a schematic depiction of an exemplary vehicle fleet management system 200 (sometimes referred to herein as system 200) which includes a telematics network 210, an optimization network 220, and a fleet operator network 230. Telematics network is in operative communication with one or more vehicle systems such as vehicle 100 via an on-vehicle telematics system such as telematics system 160. Telematics network 210 includes a network gateway 216 which is in operative communication with network gateway 228 of optimization network 220 to provide communication between telematics network 210 and optimization network 220. Fleet operator network 230 includes network gateway 236 which is in operative communication with network gateway 226 of optimization network 220 to provide communication between fleet operator network 230 and optimization network 220. Network gateway 226 and network gateway 228 be provided as a single gateway for optimization network 220 or be provided as multiple distinct gateways.

Telematics network 210, optimization network 220 and a fleet operator network 230 are distinct networks which be geographically remote from one another and which be access controlled by their respective gateways and/or other access control features and managed by different network administration authorities. Telematics network 210 may comprise a subscriber accessible network such as cellular communication network, a satellite communication network, a Wi-Fi network, and/or other types of networks providing wireless communication capability over a geographic region. Optimization network 220 comprises one or more networks of computers managed and administered by an OEM with authority to define powertrain operating templates and to generate write packages operable to reprogram or modify calibratable parameters one or more programmable components of an electronic powertrain control system. Fleet operator network 230 comprises one or more networks of computers managed and administered by a vehicle fleet owner or operator As illustrated in FIG. 2, optimization network 220 is configured to send data to and receive data from telematics network 210 and fleet operator network 230 via the aforementioned network gateways. Communication among optimization network 220, telematics network 210 and fleet operator network 230 may be used to select any of a plurality of predetermined powertrain trim templates such as engine trim templates, other prime mover trim templates, and/or transmission trim templates that are stored in the optimization network 220, and to transmit a corresponding trim calibration data set to vehicle 100 via the telematics network 210 effective to cause the vehicle system to modify one or more responses to operator input. The predetermined powertrain trim templates may be defined to provide a desired operational characteristics based on a number of factors including fuel economy, mission duration, and safety considerations, among other factors.

Optimization network 220 includes a trim template database 222 which stores a plurality of predetermined powertrain trim templates in one or more nontransitory memory media. Operation network 220 also includes an optimization network computer system 223 which includes one or more computers that are in operative communication with trim template database 222. Optimization network computer system 223 includes a write package (WP) generator 225 which is operable to process any of the plurality of predetermined powertrain trim templates stored in trim template database 222 to generate a respective trim calibration data set that is readable by one or more electronic powertrain control systems to modify one or more responses of one or more corresponding vehicles to one or more operator inputs.

Optimization network computer system 223 is configured to receive a template selection from a computer system external to the optimization network 222 such as fleet operator network computer system 233 or a computer system in communication with telematics network 210 such as an on-vehicle communication system, for example, TMS 160 of vehicle 100. The template selection identifies one of the plurality of predetermined powertrain trim templates stored in stored in trim template database 222 and a vehicle selection information associating one or more vehicles with the template selection. Optimization network computer system 223 is further configured to use WP generator 225 to generate a write package which includes a selected trim calibration data set corresponding to the template selection and the vehicle selection.

In some implementations of system 200, the predetermined powertrain trim templates stored in trim template database 222 contain all of the information needed to generate a selected trim calibration data set for a particular vehicle or a particular engine without requiring additional information. In such implementations, the vehicle selection information includes a telematics transmission address for a particular vehicle and/or a vehicle identification number which can be included in the write package for purposes of transmitting the work package to one or more vehicles via telematics network 210.

In some implementations of system 200, the plurality of predetermined powertrain trim templates stored in trim template database are generalized relative to multiple engines, powertrain components, or vehicles such that additional information is needed to generate a write package which includes a selected trim calibration data set for a particular vehicle. In such implementations, the necessary additional information can be provided as a part of the vehicle selection information associating one or more vehicles with the template selection. For example, a generalized predetermined powertrain trim template can differentially compile, map or translate into multiple different trim calibration data set for multiple different engine types and the vehicle selection be used to distinguish or select between the different compilations, translations or mappings.

In some implementations, the vehicle selection information further includes conditional access information, such as an authorization code, a digital signature, a digital token, or another digital credential. The conditional access information allows the write package to be implemented in one or more components of a powertrain control system of a particular vehicle which imposes conditional access security features on one or more components of its electronic control system.

Optimization network computer system 223 is configured to transmit the write package via a telematics network to at least one vehicle corresponding to the vehicle selection and including a respective electronic powertrain control system. Transmission of the write package to such a vehicle is effective to cause the respective electronic powertrain control system to read the selected trim calibration data set to modify a response of the at least one vehicle to the operator input.

Optimization network computer system 223 is configured to receive a prediction request including one or more of a load characteristic, a mission characteristic, and an operator characteristic. The prediction request may be received from an external computer system such as fleet operator network computer system 233 or a computer system in communication with telematics network 210 such as an on-vehicle communication system, for example, TMS 160 of vehicle 100.

Optimization network computer system 223 includes a prediction engine 227 which is operable to generate a plurality of predictions corresponding to respective ones of the plurality of predetermined powertrain trim templates, each of the plurality of predictions including a fuel consumption prediction and a mission completion prediction. The prediction engine 227 may be configured to generate the plurality of predictions by performing simulations using received load characteristic, received mission characteristic and received operator characteristic in combination with each of the plurality of predetermined engine trim templates. Optimization network computer system 223 is configured to transmit the plurality of predictions generated by prediction engine 227 from the optimization network to an external computer system such as fleet operator network computer system 233 or a computer system in communication with telematics network 210 such as an on-vehicle communication system, for example, TMS 160 of vehicle 100.

In certain embodiments, the load characteristic comprises a vehicle load mass, a vehicle load weight, any of the further load characteristics disclosed herein, or combinations of the foregoing or other load characteristics. In certain embodiments, the mission characteristic comprises a route of travel, a distance of travel. Any of the further mission characteristics disclosed herein, or combinations of the foregoing or other mission characteristics. In certain embodiments, the operator characteristic comprises an operator experience rating, an operator driving history rating, any of the further operator characteristics disclosed herein, or combinations of the foregoing or other operator characteristics.

A predetermined powertrain trim template can be selected by a computer system in operator network 230 based on a number of factors, for example, whether the vehicle is on a city route or a highway route, whether a load is to be made with an expedited delivery or a standard delivery, whether the driver is an experienced driver, a new driver, or an unsafe driver based on an accident history, whether the vehicle should travel within certain fuel efficiency parameters or not, or a combination of these and other factors. Various predetermined powertrain trim templates can be predetermined to provide desired vehicle response adapted to these and other factors. Examples of engine trim parameters include speed governors, acceleration ramp rate limiters, idle speed settings, idle shutdown times and a number of other trim parameters. Customized templates and fleet decision logic design associated with the templates be stored in one or more storage devices of one or more computer systems of system 200 such as the computer systems described above.

In some embodiments, each of the templates comprises information useful to generate a plurality of engine trim parameters that are implementable by one or more components of electronic control system 125, such as EPM 150 and ECU 130, to control one or more operational response characteristics of vehicle 100 which include powertrain responses to human operator control inputs, semi-autonomous command system inputs, and autonomous command system inputs. In example implementations, operational response characteristics also include vehicle operational considerations such as: a pre-set maximum speed-limit for new or unsafe drivers, enabling idle shutdown in temperate regions, disabling idle shutdown in extreme weather conditions, allowing less restrictive driver speed setting for experienced and safe drivers, to make up time due to a delay (e.g., a flat tire or traffic), or to meet a time-critical pick-up or drop off time.

A fleet operator can be afforded the flexibility to dynamically select and modify vehicle response to operator inputs by selecting a predetermined powertrain trim template best suited for a fleet's particular requirements and standards from a plurality of predetermined powertrain trim templates. The fleet operator can be provided with the ability to make "on-the-fly" parameter adjustments to better control fuel costs, to adapt to environmental and road conditions, and to ensure timely pick-up and delivery.

Referring now to FIGS. 3-6, there are illustrated several exemplary processes which may be performed by a vehicle fleet management system such as system 200 in connection with one or more vehicles such as vehicle 100. In the following description, the operations of these exemplary processes may be described in connection with certain aspects of system 200 and vehicle 100, however, it shall be appreciated that they may also be performed in connection with a variety of other vehicle fleet management systems and vehicles. Accordingly, process operations pertaining to features of system 200 or vehicle 100 are understood to apply to such other vehicle fleet management systems and vehicles.

Figure 3:
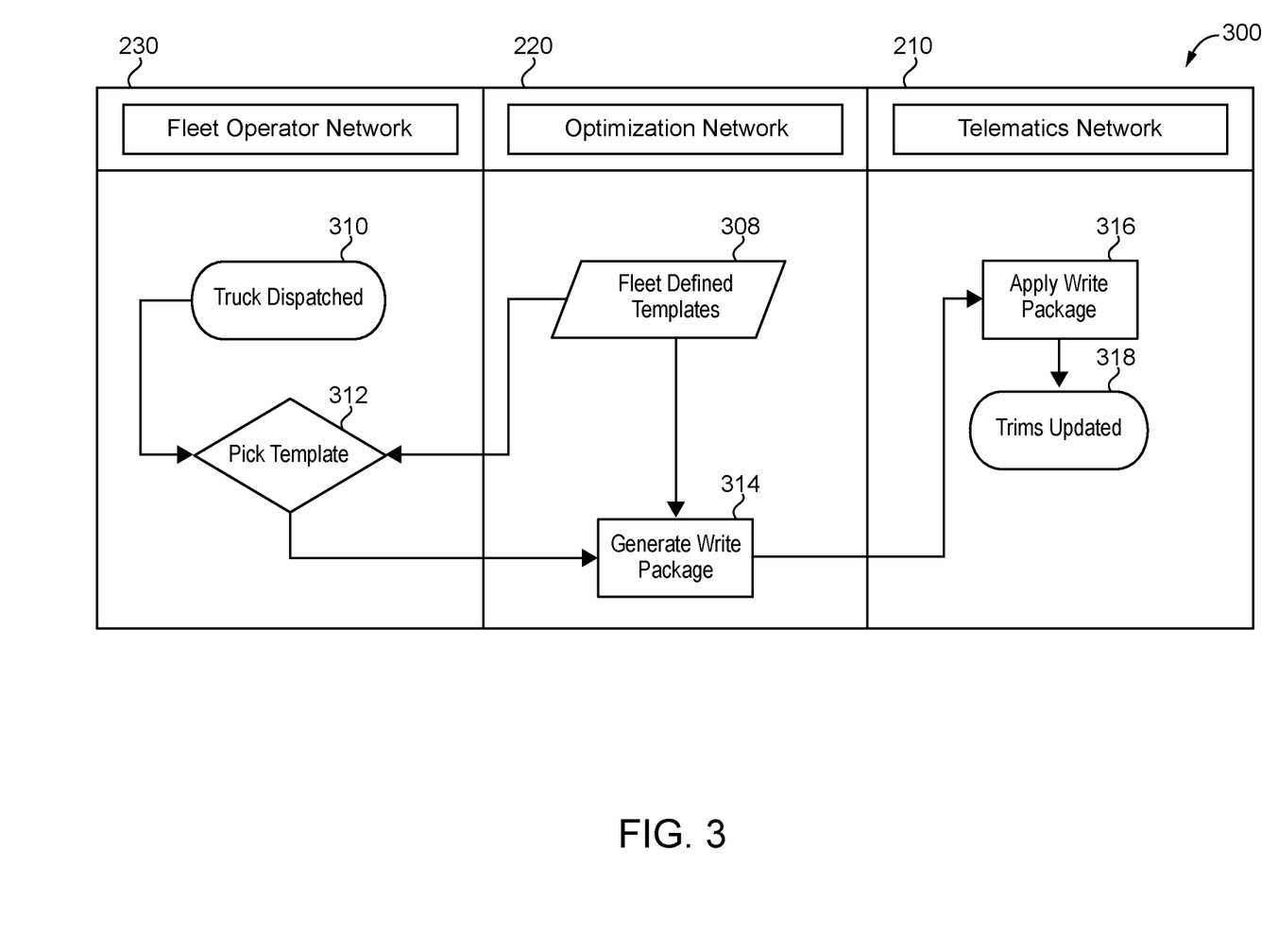
FIGS. 3-6 are flow diagrams illustrating certain aspects of exemplary processes executable by or in connection with the systems of FIGS. 1 and 2.

With reference to FIG. 3 there is illustrated a flow diagram illustrating certain aspects of an exemplary process 300 which can be performed by vehicle fleet management system 200. At operation 308, a plurality of predetermined powertrain trim templates are stored in a database, such as trim template database 222, implemented in one or more nontransitory memory media provided in optimization network 230 and accessible by one or more computer systems of optimization network 230, such as optimization network computer system 223. The plurality of predetermined powertrain trim templates are also provided from optimization network 220 to fleet operator network 230 and may be communicated or transmitted via the network infrastructure disclosed herein, via another network infrastructure, or by a variety of other transmission or communication methods and techniques.

At operation 310, fleet operator network 230 dispatches vehicle 100 for a particular transport mission which may be defined in terms of a particular route to be followed or in terms of an origin location and a destination location and may be further defined in terms of a targeted or required delivery time, by characteristics of vehicle 100 or its powertrain components, or by characteristics of the vehicle operator such as an experience rating or an operating history rating, or by any of the other mission parameters disclosed herein. At operation 312, a computer system of fleet operator network 230, such as fleet operator network computer system 233, transmits a template selection indicating one of the plurality of predetermined powertrain trim templates stored in the database of optimization network 220 and a vehicle selection associating one or more vehicles with the template selection. The template selection and vehicle selection transmitted by fleet operator network 230 are received by a computer system of optimization network 220, such as optimization network computer system 223, which identifies a predetermined powertrain trim template in response to the received template selection.

At operation 314, once the specified predetermined powertrain trim template is identified, the computer system of optimization network 220 utilizes the selected powertrain trim templates to generate a write package. The write package includes a respective trim calibration data set corresponding to the selected powertrain trim template that is readable by one or more electronic powertrain control systems to modify one or more responses of one or more corresponding vehicles to one or more operator inputs. Each of the plurality predetermined powertrain trim templates may comprise different information from which a plurality of different engine trim parameters may be generated and implemented in an electronic powertrain control system, for example, one or more components of electronic control system 125, such as EPM 150 and ECU 130, to control one or more operational response characteristics of engine or other powertrain components of a vehicle, such as vehicle 100. As described above each of the plurality of predetermined powertrain trim templates may contain all of the information needed to generate a trim calibration data set for a particular vehicle or a particular engine without requiring additional information or may require additional information to generate a trim calibration data set for a particular vehicle or a particular engine. The write package also includes information indicating a transmission address and/or vehicle identification to facilitate transmission of the write package to a particular vehicle. The write package may further include the aforementioned conditional access information to permit its implementation in an electronic powertrain control system including access control features.

Optimization network 220 transmits the write package to a vehicle such as vehicle 100 via telematics network 210. At operation 316, the write package is received by on-vehicle telematics system 160 of vehicle 100 which is in operative communication with the telematics network 210. The write package is then provided to EPM 150 of vehicle 100. At operation 318, the selected trim calibration data of the write package is read by one or more components of electronic control system 125, such as EPM 150 and/or ECU 130, in order to modify a response of the vehicle 100 to an operator input control and thereby modify one or more operational response characteristics of the vehicle's 100 engine.

Figure 4:
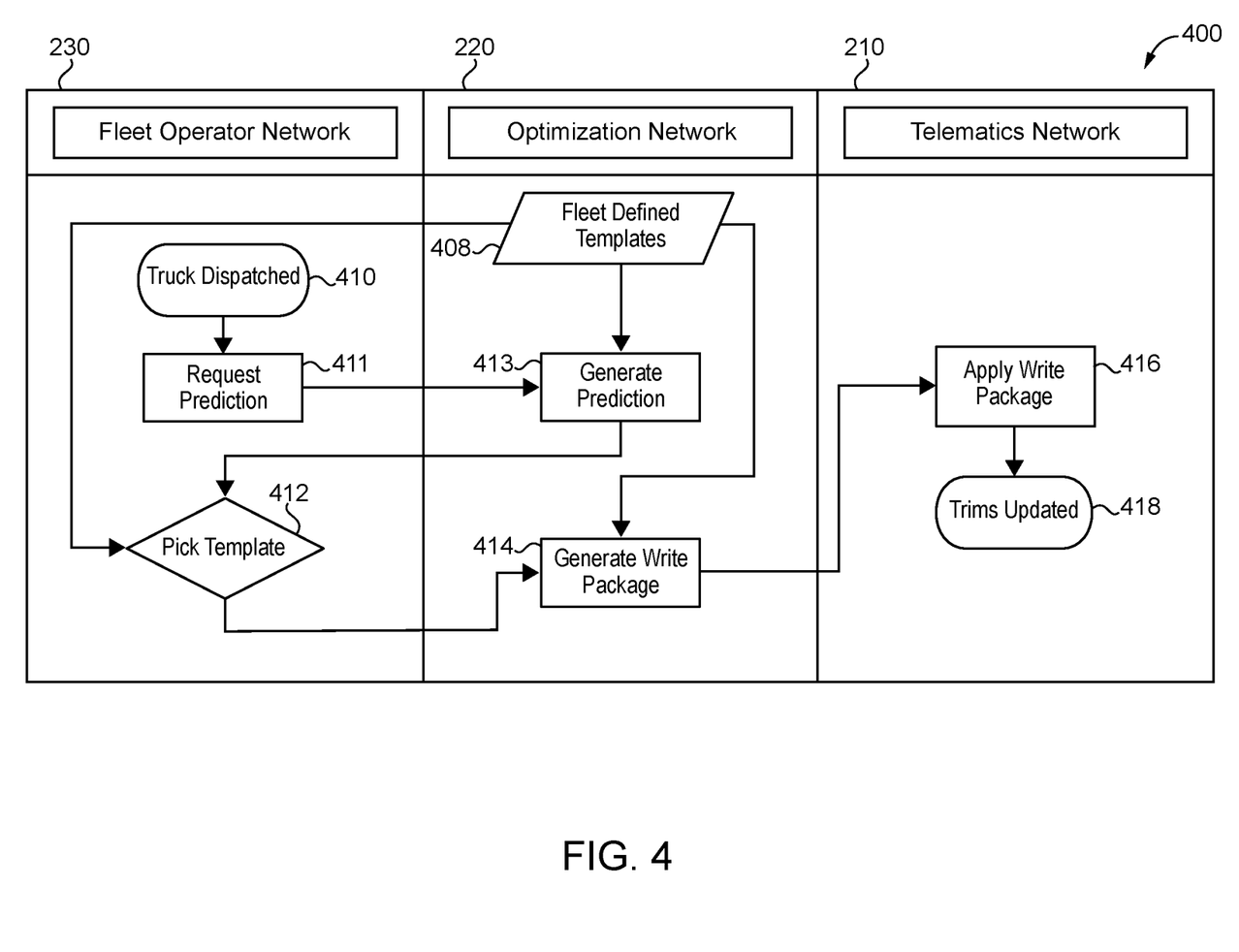

With reference to FIG. 4, there is illustrated a flow diagram illustrating certain aspects of an exemplary process 400 which be performed by vehicle fleet management system 200. At operation 408, a plurality of predetermined powertrain trim templates are stored in a database, such as trim template database 222, implemented in one or more nontransitory memory media provided in optimization network 230 and accessible by one or more computer systems of optimization network 230, such as optimization network computer system 223. The plurality of predetermined powertrain trim templates are also provided from optimization network 220 to fleet operator network 230 and may be communicated or transmitted via the network infrastructure disclosed herein, via another network infrastructure, or by a variety of other transmission or communication methods and techniques.

At operation 410, fleet operator network 230 dispatches vehicle 100 for a particular transport mission which may be defined in terms of a particular route to be followed or in terms of an origin location and a destination location and may be further defined in terms of a targeted or required delivery time, by characteristics of vehicle 100 or its powertrain components, or by characteristics of the vehicle operator such as an experience rating or an operating history rating, or by any of the other mission parameters disclosed herein.

At operation 411, a computer system in fleet operator network 230, such as fleet operator network computer system 233, sends a prediction request to optimization network 220. The prediction request includes one or more of a load characteristic (e.g., the mass or the weight of the load being hauled by vehicle 100 on the dispatched transport mission), a mission characteristic (e.g., the route to be traveled in the mission and/or the start point and end point of the mission), and an operator characteristic (e.g., an operator experience rating or an operator driving history rating). The prediction request further identifies one or more parameters for which a prediction is required which may include a fuel consumption prediction (e.g., a prediction of total fuel consumption or average fuel economy for a mission) and/or a mission completion prediction (e.g., a predicted time of mission completion or a predicted mission duration). The prediction request may also specify one or more predetermined powertrain trim templates for which the prediction is requested, or may by default specify a set of all predetermined powertrain trim templates associated with fleet operator network 230.

The transmitted prediction request is processed by a computer system of optimization network 220, such as optimization network computer system 223, to generate a plurality of predictions corresponding to respective ones of the plurality of predetermined powertrain trim templates, each of the plurality of predictions including a fuel consumption prediction and a mission completion prediction. For example, operation 411 may transmit a prediction request seeking a fuel consumption prediction and a mission completion prediction for each of the predetermined powertrain trim templates which is received and processed by a computer system in optimization network 220 at operation 413. The requested predictions may include a prediction of the fuel and time required to complete a mission by operating vehicle 100 using each of the predetermined powertrain templates over a particular route and with a particular load.

At operation 413 a computer system of optimization network 220, such as optimization network computer system 223, generates a plurality of predictions by performing simulations using the load characteristic, the mission characteristic, and the operator characteristic in combination with each of the plurality of predetermined engine trim templates. For example, the simulation performed at operation 413 may utilize information such as the mission start point, mission endpoint, mission route of travel, vehicle load mass or weight, vehicle engine type, vehicle chassis type, vehicle trailer type, and vehicle operator experience rating or operation history rating. The predictions generated at operation 413 are transmitted from optimization network 220 to fleet operator network 230 where they may be utilized to inform the decision of which of the plurality of predetermined powertrain trim templates is to be selected.

At operation 412, a computer system of fleet operator network 230, such as fleet operator network computer system 233, transmits a template selection indicating one of the plurality of predetermined powertrain trim templates stored in the database of optimization network 220 and a vehicle selection associating one or more vehicles with the template selection. The template selection and vehicle selection transmitted by fleet operator network 230 are received by a computer system of optimization network 220, such as optimization network computer system 223, which identifies a predetermined powertrain trim template in response to the received template selection.

At operation 414, once the specified predetermined powertrain trim template is identified, the computer system of optimization network 220 utilizes the selected powertrain trim templates to generate a write package. The write package includes a respective trim calibration data set corresponding to the selected powertrain trim template that is readable by one or more electronic powertrain control systems to modify one or more responses of one or more corresponding vehicles to one or more operator inputs. Each of the plurality predetermined powertrain trim templates may comprise different information from which a plurality of different engine trim parameters may be generated and implemented in an electronic powertrain control system, for example, one or more components of electronic control system 125, such as EPM 150 and ECU 130, to control one or more operational response characteristics of engine or other powertrain components of a vehicle, such as vehicle 100. As described above each of the plurality of predetermined powertrain trim templates may contain all of the information needed to generate a trim calibration data set for a particular vehicle or a particular engine without requiring additional information or may require additional information to generate a trim calibration data set for a particular vehicle or a particular engine. The write package also includes information indicating a transmission address and/or vehicle identification to facilitate transmission of the write package to a particular vehicle. The write package may further include the aforementioned conditional access information to permit its implementation in an electronic powertrain control system including access control features.

Optimization network 220 transmits the write package to a vehicle such as vehicle 100 via telematics network 210. At operation 416, the write package is received by on-vehicle telematics system 160 of vehicle 100 which is in operative communication with the telematics network 210. The write package is then provided to one or more components of electronic control system 125, such as EPM 150 and ECU 130 of vehicle 100. At operation 418, the selected trim calibration data of the write package is read by the one or more components of electronic control system 125 to modify a response of the vehicle 100 to an operator input control and thereby modify one or more operational response characteristics of the vehicle's 100 engine.

Figure 5:
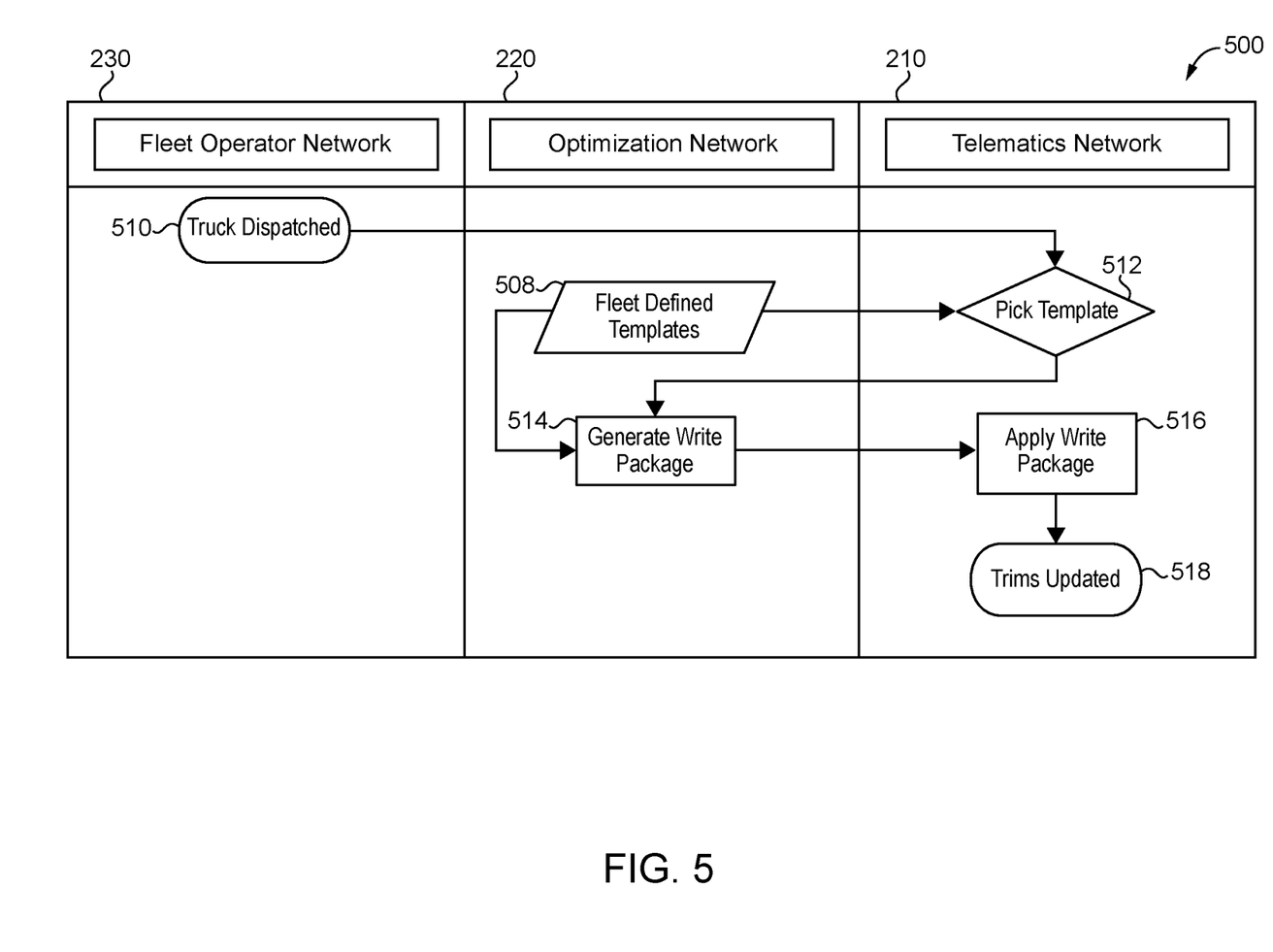

With reference to FIG. 5 there is illustrated a flow diagram illustrating certain aspects of an exemplary process 500, which be performed by vehicle fleet management system 200. Process 500 includes a number of operations having aspects that are the same or similar to the operations of process 300 described above. For example, operations 508, 510, 512, 514, 516 and 518 generally correspond to and include the features of operations 308, 310, 312, 314, 316 and 318 described above. Process 500 also differs from process 300 in certain respects. For example, in process 300, operation 312 is performed by a computer system in fleet operator network 230 whereas, in process 500, operation 512 is performed by a computer system in operative communication with telematics network 510 which may be, for example, a computer system on-board vehicle 100 or another computer system.

Figure 6:
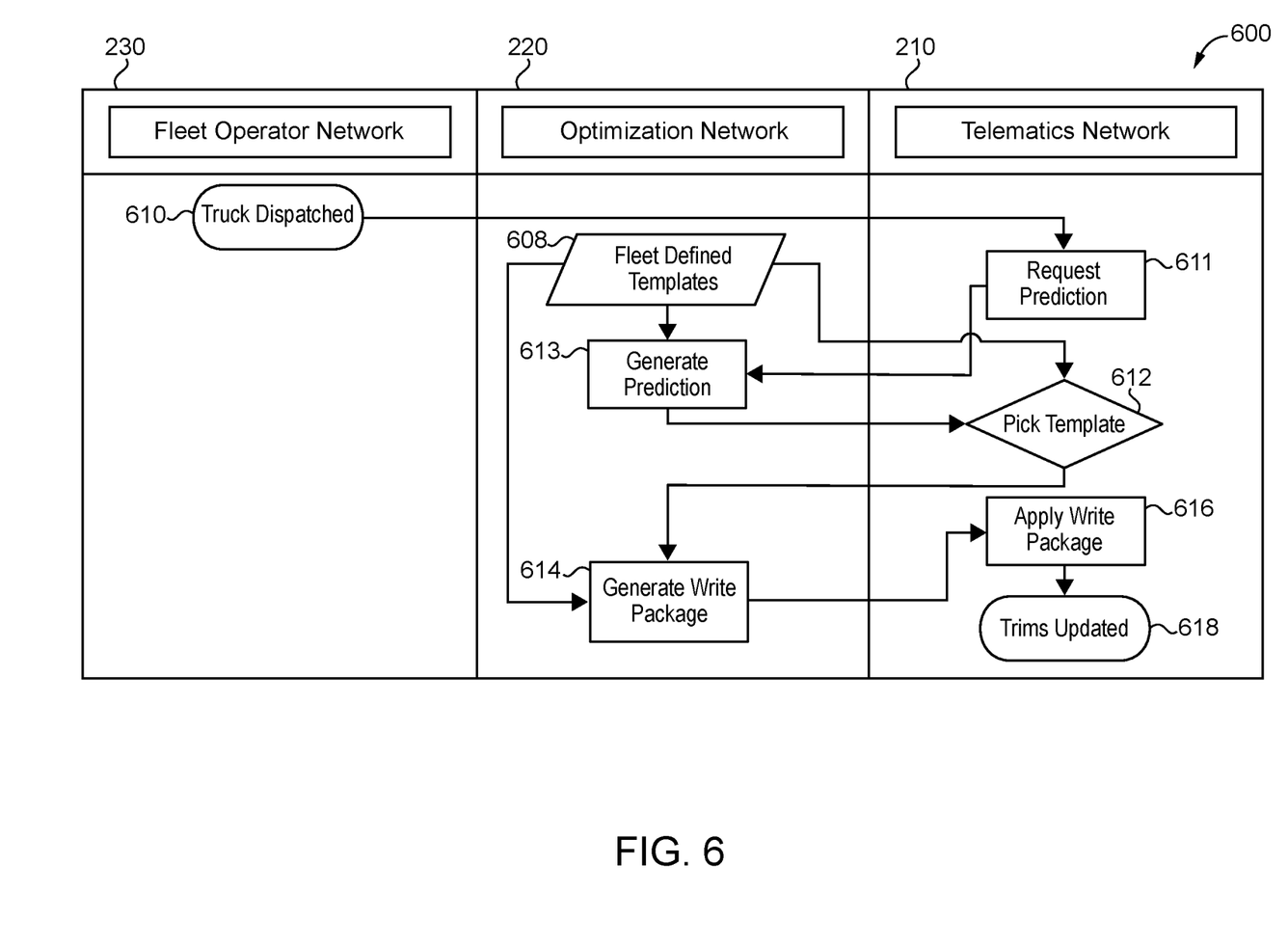

With reference to FIG. 6, there is illustrated a flow diagram illustrating certain aspects of an exemplary process 600, which be performed by vehicle fleet management system 200. Process 600 includes a number of operations having aspects that are the same or similar to the operations of process 400 described above. For example, operations 608, 610, 611, 612, 613, 614, 616 and 618 generally correspond to and include the features of operations 408, 410, 411, 412, 413, 414, 416 and 418 described above. Process 600 also differs from process 400 in certain respects. For example, in process 400, operation 411 and operation 412 are performed by a computer system in fleet operator network 230 whereas, in process 600, operation 611 and 612 ARE performed by a computer system in operative communication with telematics network 210 which may be, for example, a computer system on-board vehicle 100 or another computer system.

It shall be appreciated that processes 300, 400, 500, and 600 are non-limiting examples of a process or method which includes the following operational aspects. A first operational aspect includes storing a plurality of predetermined powertrain trim templates in a database implemented in one or more nontransitory memory media and accessible by a first computer system in an optimization network, the first computer system being operable to process any of the plurality of predetermined powertrain trim templates to generate a respective trim calibration data set that is readable by one or more electronic powertrain control systems to modify one or more responses of one or more corresponding vehicles to one or more operator inputs. A second operational aspect includes receiving with the first computer system from a second computer system external to the optimization network a template selection indicating one of the plurality of predetermined powertrain trim templates and a vehicle selection associating one or more vehicles with the template selection. A third operational aspect includes generating with the first computer system a write package including a selected trim calibration data set corresponding to the template selection and the vehicle selection. A fourth operational aspect includes transmitting the write package from the optimization network to a telematics network in operative communication with at least one vehicle corresponding to the vehicle selection and including a respective electronic powertrain control system, the act of transmitting being effective to cause the respective electronic powertrain control system to read the selected trim calibration data set to modify a response of the at least one vehicle to an operator input.

It shall be appreciated that processes 400 and 600 are non-limiting examples of a process or method which includes the following additional operational aspects. A first additional aspect includes receiving with the first computer system from the second computer system a prediction request including one or more of a load characteristic, a mission characteristic, and an operator characteristic. A second additional aspect includes generating with the first computer system a plurality of predictions corresponding to respective ones of the plurality of predetermined powertrain trim templates, each of the plurality of predictions including a fuel consumption prediction and a mission completion prediction. A third additional aspect includes transmitting the plurality of predictions from the optimization network to the second computer system.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicates that the feature so described be more desirable, it nonetheless not be necessary and embodiments lacking the same be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method comprising:
   storing a plurality of predetermined powertrain trim templates in a database implemented in one or more nontransitory memory media and accessible by a first computer system in an optimization network, the first computer system being operable to process any of the plurality of predetermined powertrain trim templates to generate a respective trim calibration data set that is readable by one or more electronic powertrain control systems to modify one or more responses of one or more corresponding vehicles to one or more operator inputs;
   receiving with the first computer system from a second computer system external to the optimization network a template selection indicating one of the plurality of predetermined powertrain trim templates and a vehicle selection associating one or more vehicles with the template selection;
   generating with the first computer system a write package including a selected trim calibration data set corresponding to the template selection and the vehicle selection; and
   transmitting the write package from the optimization network to a telematics network in operative communication with at least one vehicle corresponding to the vehicle selection and including a respective electronic powertrain control system, the act of transmitting being effective to cause the respective electronic powertrain control system to read the selected trim calibration data set to modify a response of the at least one vehicle to an operator input.

2. The method of claim 1 further comprising:
   receiving with the first computer system from the second computer system a prediction request including one or more of a load characteristic, a mission characteristic, and an operator characteristic;
   generating with the first computer system a plurality of predictions corresponding to respective ones of the plurality of predetermined powertrain trim templates, each of the plurality of predictions including a fuel consumption prediction and a mission completion prediction; and
   transmitting the plurality of predictions from the optimization network to the second computer system.

3. The method of claim 2 wherein the load characteristic comprises a vehicle load mass or a vehicle load weight.

4. The method of claim 2 wherein the mission characteristic comprises one or more of a route of travel and a distance of travel.

5. The method of claim 2 wherein the operator characteristic comprises one or more of an operator experience rating and an operator driving history rating.

6. The method of claim 2 wherein the first computer system generates the plurality of predictions by performing simulations using the load characteristic, the mission characteristic, and the operator characteristic in combination with each of the plurality of predetermined powertrain trim templates.

7. The method of claim 1, wherein the second computer system is a computer system of a fleet operator network.

8. A system comprising:
   an optimization network comprising a database storing a plurality of predetermined powertrain trim templates in one or more nontransitory memory media, and a first computer system operable to process any of the plurality of predetermined powertrain trim templates to generate a respective trim calibration data set that is readable by one or more electronic powertrain control systems to modify one or more responses of one or more corresponding vehicles to one or more operator inputs, wherein the first computer system is configured to
   receive from a second computer system external to the optimization network a template selection indicating one of the plurality of predetermined powertrain trim templates and a vehicle selection associating one or more vehicles with the template selection,
   generate a write package including a selected trim calibration data set corresponding to the template selection and the vehicle selection, and
   transmit the write package via a telematics network to at least one vehicle corresponding to the vehicle selection and including a respective electronic powertrain control system effective to cause the respective electronic powertrain control system to read the selected trim calibration data set to modify a response of the at least one vehicle to the operator input.

9. The system of claim 8 wherein the first computer system is configured to
   receive from the second computer system a prediction request including one or more of a load characteristic, a mission characteristic, and an operator characteristic;
   generate a plurality of predictions corresponding to respective ones of the plurality of predetermined powertrain trim templates, each of the plurality of predictions including a fuel consumption prediction and a mission completion prediction; and
   transmit the plurality of predictions from the optimization network to the second computer system.

10. The system of claim 9 wherein the load characteristic comprises a vehicle load mass or weight.

11. The system of claim 9 wherein the mission characteristic comprises one or more of a route of travel and a distance of travel.

12. The system of claim 9 wherein the operator characteristic comprises one or more of an operator experience rating and an operator driving history rating.

13. The system of claim 9 wherein the first computer system is configured to generate the plurality of predictions by performing simulations using the load characteristic, the mission characteristic, and the operator characteristic in combination with each of the plurality of predetermined powertrain trim templates.

14. The system of claim 9, wherein the second computer system is a computer system of a fleet operator network.

15. A system comprising:
a first computer network comprising one or more non-transitory memory media storing a plurality of predetermined powertrain trim templates, and one or more computers configured to process any of the plurality of predetermined powertrain trim templates to generate a respective trim calibration data set that is usable by an electronic powertrain controller to modify a response of a vehicle to an operator input; wherein the one or more computers is configured to
receive from a second computer network a template selection indicating one of the plurality of predetermined powertrain trim templates,
generate a write package including a selected trim calibration data set corresponding to the template selection, and
transmit the write package to a telematics network in operative communication with the vehicle including the electronic powertrain controller effective to cause the electronic powertrain controller to modify the response of the vehicle to the operator input in using the selected trim calibration data set.

16. The system of claim 15 wherein the one or more computers is configured to
receive from the second computer network a prediction request including a load characteristic and a mission characteristic;
generate a plurality of predictions corresponding to respective ones of the plurality of predetermined powertrain trim templates, each of the plurality of predictions including a fuel consumption prediction and a mission completion prediction; and
transmit the plurality of predictions from the first computer network to the second computer network.

17. The system of claim 16 wherein the load characteristic comprises a mass or a weight of vehicle load and the mission characteristic comprises one or both of a route of travel and a distance of travel.

18. The system of claim 16 wherein the fuel consumption prediction comprises one or more of an average fuel economy metric and a total fuel consumption metric.

19. The system of claim 16 wherein the mission completion prediction comprises one of a travel duration metric and an arrival time metric.

20. The system of claim 16 wherein the one or more computers are configured to generate the plurality of predictions by performing simulations using the load characteristic and the mission characteristic in combination with each of the plurality of predetermined powertrain trim templates.

21. The method of claim 1 wherein the first computer system is operable to differentially compile, map, or translate any of the plurality of predetermined powertrain trim templates into a plurality of powertrain-specific trim calibration data sets each adapted for a particular one of a plurality of different engine types.

22. The system of claim 8 wherein the vehicle selection includes conditional access information, and the conditional access information is included in the write package to allow the write package to be implemented in one or more components of a powertrain control system of a particular vehicle which imposes conditional access security features on the one or more components of its electronic control system.

23. The system of claim 15 wherein the one or more computers is configured compile, map, or translate any of the plurality of predetermined powertrain trim templates into a plurality of different powertrain-specific trim calibration data sets each adapted for a respective particular powertrain.

* * * * *